A. N. ANTHES.
SHOCK ABSORBER.
APPLICATION FILED OCT. 7, 1920.
1,383,592.
Patented July 5, 1921.
2 SHEETS—SHEET 1.
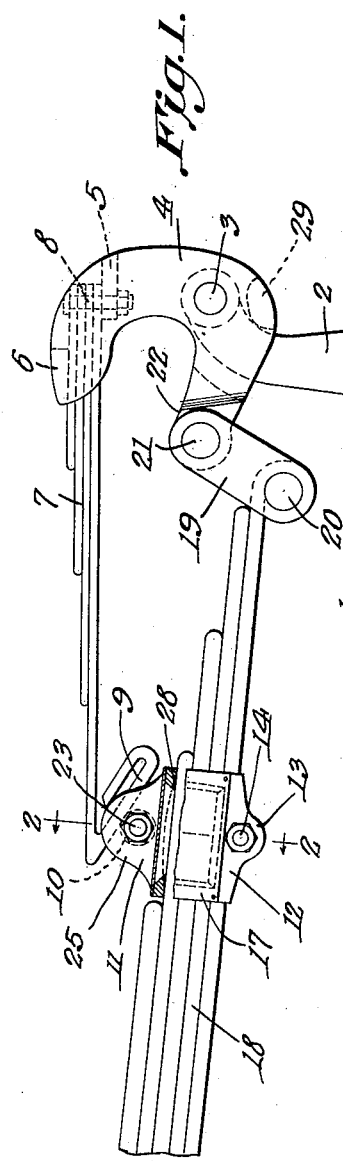
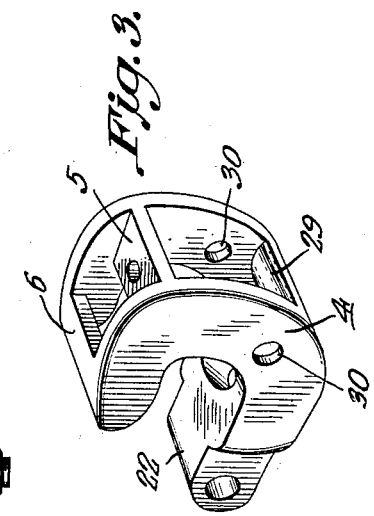
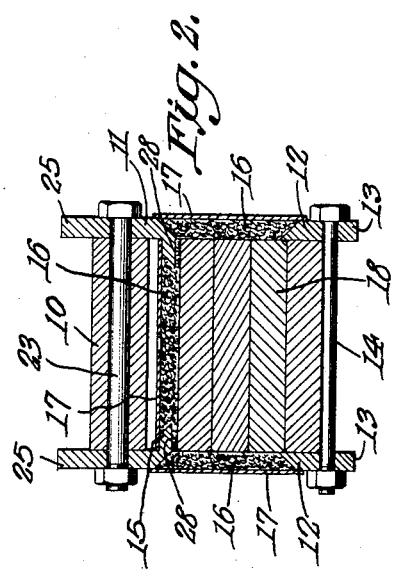
Inventor
Albert N. Anthes
by
Attorneys A. N. ANTHES.
SHOCK ABSORBER.
APPLICATION FILED OCT. 7, 1920.
1,383,592.
Patented July 5, 1921.
2 SHEETS—SHEET 2.
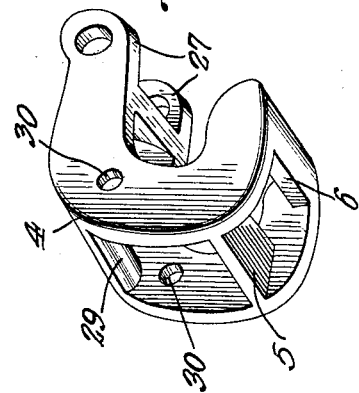
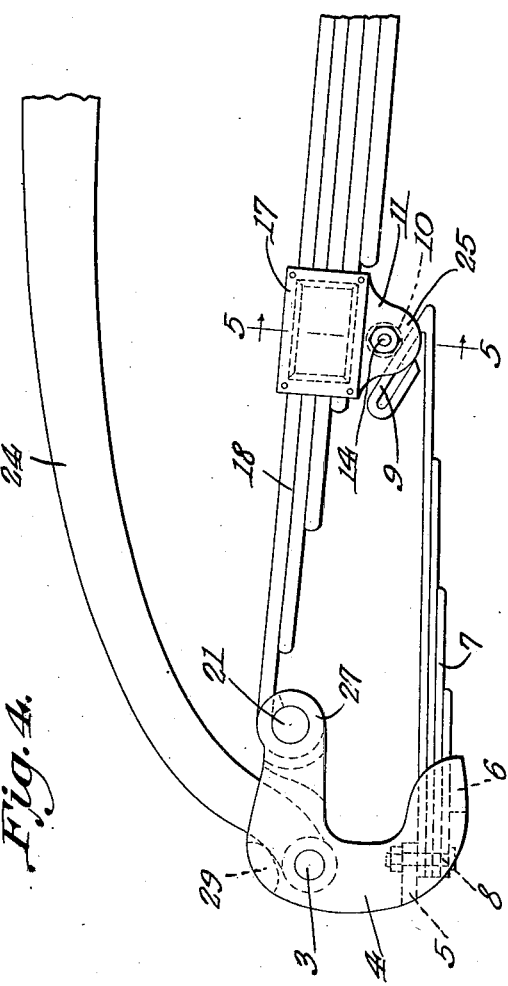
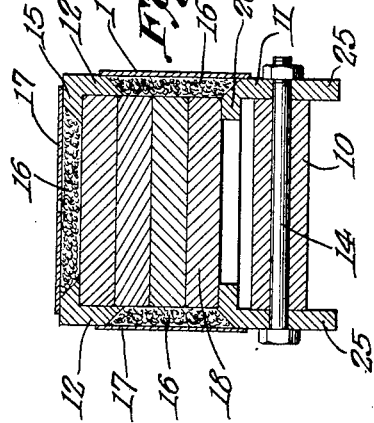
Inventor
Albert N. Anthes
by Jerry A Mathews
and Lester L Sargent
Attorneys.

UNITED STATES PATENT OFFICE.

ALBERT N. ANTHES, OF FORT MADISON, IOWA.

SHOCK-ABSORBER.

1,383,592. Specification of Letters Patent. Patented July 5, 1921.

Application filed October 7, 1920. Serial No. 415,233.

*To all whom it may concern:*

Be it known that I, ALBERT N. ANTHES, a citizen of the United States, residing at Fort Madison, in the county of Lee and State of Iowa, have invented a new and useful Shock-Absorber, of which the following is a specification.

This invention relates to an improved combined shock absorbing device for automobiles, and other vehicles.

In the accompanying drawings illustrating my invention, Figure 1 is a side elevation of the invention applied to an automobile of the type having the spring supported from the axle and arranged transversely of the machine;

Fig. 2 is a section on line 2—2 of Fig. 1;

Fig. 3 is a detail perspective view of member 4;

Fig. 4 is a side elevation of my invention applied to the type of automobile having its springs disposed longitudinally of the vehicle;

Fig. 5 is a transverse section on line 5—5 of Fig. 4, and

Fig. 6 is a detail perspective view of the modified form of member 4 used with this latter type of vehicle.

Like numerals designate like parts in each of the several views.

Referring to the accompanying drawings, I provide a novel stirrup 4 of approximately U-shape, pivotally mounted on pivot 3 which is carried by perch 2, which latter member is mounted on axle 1 in the customary manner. Member 4 is provided with a transverse plate 5 spaced apart from the transverse end plate 6, as shown in Fig. 1 and adapted to receive and support the end of leaf spring 7 and secure same in place by means of a suitable bolt 8, as illustrated. Leaf spring 7 terminates in an angularly bent end portion, the inclined surface of which rides on a rotatable roller 10, which is mounted on bolt 23, which is supported in ears 25 of the cage or clip 11, which latter member is mounted on the main spring 18, a short distance from its end, as shown.

As illustrated in Fig. 2, member 11 is provided with slotted side plates 12 and is packed on its top and sides with felt oilers 16. The upwardly curved edge 28 provides a space through which oil may seep from the top to the side oilers. I provide suitable cover plates 17 to hold the oilers in place. I provide shackle plates 19 which are connected by a pin 20 to the end of the main spring 18 and by a pin 21 to the tongue 22 of stirrup 4. Stirrup 4 is also provided with a cross strip 29 which normally is in contact with the perch 2, as indicated in dotted lines.

Figs. 4, 5 and 6 illustrate my invention as it appears when applied to a vehicle having springs extending longitudinally. Members 4, 11 and 7 being arranged in inverted position. I further provide member 4 with duplicate spaced tongues 27 in lieu of single tongue 22; this element, however, having an identical function with that shown in the other form of my invention. Member 29 is normally in contact with the side frame member 24 of the vehicle, as illustrated in Fig. 4. Referring to Fig. 5 I provide a slotted supporting plate 26, on which the main spring 18 rests. I provide openings 30 for pivotally mounting member 4.

In operation a compound spring action is obtained, the surface of angular end 9 of spring 7 riding upwardly on the rotatable roller 10 and the device operating to absorb the shock and prevent rebound, and to prevent side motion.

In the form of the invention shown in Figs. 4, 5, and 6 a similar result is obtained although the parts are disposed in an inverted position, and the plates 19 are eliminated. The device combines oiling means, as shown in Fig. 2, in combination with the combined spring suspension disclosed in Fig. 1.

What I claim is:

1. In a device of the class described, the combination of a U-shaped stirrup adapted to be pivotally mounted in position to be operatively connected with and provide a support for the end of the main spring of the vehicle, a leaf spring rigidly attached to the other end of the pivot member, said leaf spring terminating in an angularly bent end portion, a clip mounted on the main spring, said clip carrying a rotatable roller, on which the angularly bent end of the aforesaid spring is adapted to ride and means to limit the tilting movement of the stirrup.

2. In a device of the class described, the combination of a U-shaped stirrup adapted to be pivotally mounted in position to be operatively connected with and provide a support for the end of the main spring of the vehicle, a leaf spring rigidly attached to the other end of the pivot member, said leaf spring terminating in an angularly bent end portion, a clip mounted on the main spring, said clip carrying a rotatable roller on which the angularly bent end of the aforesaid spring is adapted to ride, means to limit the tilting movement of the stirrup, the clip having slotted side and top plates and having oiler members positioned on the top and sides adjacent the main spring, each of the side oilers being in contact with the top one.

3. In a device of the class described, as a new article of maufacture, a stirrup of approximately U-shape, having one or more tongue elements at one end, and having plate members adapted to receive and support a leaf spring at the other end, the stirrup having openings for pivotally mounting same and having a cross-bar in proximity to said openings adapted to contact with the part of the vehicle on which the apparatus is mounted, and thereby limit the tilting movement of the stirrup.

ALBERT N. ANTHES.